(12) United States Patent
Mitsuo et al.

(10) Patent No.: US 10,080,403 B2
(45) Date of Patent: Sep. 25, 2018

(54) COMPONENT-SECURING DEVICE

(71) Applicant: HONDA ACCESS CORP., Niiza-shi, Saitama (JP)

(72) Inventors: Kazutaka Mitsuo, Niiza (JP); Ryoichi Adachi, Niiza (JP); Masanori Seo, Niiza (JP)

(73) Assignee: HONDA ACCESS CORP., Niiza-shi, Saitama (JP)

( * ) Notice: Subject to any disclaimer, the term of this patent is extended or adjusted under 35 U.S.C. 154(b) by 65 days.

(21) Appl. No.: 14/917,164

(22) PCT Filed: Dec. 10, 2013

(86) PCT No.: PCT/JP2013/083034
§ 371 (c)(1),
(2) Date: Mar. 7, 2016

(87) PCT Pub. No.: WO2015/040760
PCT Pub. Date: Mar. 26, 2015

(65) Prior Publication Data
US 2016/0206053 A1 Jul. 21, 2016

(30) Foreign Application Priority Data
Sep. 17, 2013 (JP) ................... 2013-191858

(51) Int. Cl.
*A44B 17/00* (2006.01)
*F16B 5/06* (2006.01)
*F16B 21/07* (2006.01)

(52) U.S. Cl.
CPC ........ *A44B 17/0041* (2013.01); *A44B 17/007* (2013.01); *A44B 17/0076* (2013.01); *F16B 5/0642* (2013.01); *F16B 21/073* (2013.01)

(58) Field of Classification Search
CPC .............. A44B 17/0041; A44B 17/007; A44B 17/0076; F16B 21/073; F16B 5/0642
See application file for complete search history.

(56) References Cited

U.S. PATENT DOCUMENTS

| 4,727,630 A | 3/1988 | Alan |
| 6,347,435 B1 | 2/2002 | Davignon et al. |

(Continued)

FOREIGN PATENT DOCUMENTS

| CN | 102159837 A | 8/2011 |
| GB | 1221829 A | 2/1971 |
| JP | 3065298 U | 2/2000 |

OTHER PUBLICATIONS

Office Action dated Sep. 28, 2016, issued in counterpart Chinese Patent Application No. 2013380079600.5 (6 pages).

(Continued)

*Primary Examiner* — Robert Sandy
*Assistant Examiner* — Louis A Mercado
(74) *Attorney, Agent, or Firm* — Westerman, Hattori, Daniels & Adrian, LLP

(57) ABSTRACT

In a component-securing device, in a state in which a base member is secured to a component by the engagement of an engagement portion of a clip to a to-be-engaged portion of a joining pin, pushing a pair of pressing portions in an outer peripheral portion of the clip in a direction (see arrow A) of approaching each other makes the outer peripheral portion deform and a pair of joining pin insertion portions move in a direction of moving away from each other, and engagement between the engagement portion of the clip and the to-be-engaged portion of the joining pin is released, thereby enabling the clip to be polled out from the joining pin. Merely deforming the outer peripheral portion of the clip inward enables the engagement with the joining pin to be released.

9 Claims, 9 Drawing Sheets

(56) References Cited

U.S. PATENT DOCUMENTS

2011/0162171  A1    7/2011   Gmeilbauer
2012/0186050  A1    7/2012   Justin

OTHER PUBLICATIONS

International Search Report dated Feb. 10, 2014, issued in counterpart Application No. PCT/JP2013/083034 (2 pages).

COMPONENT-SECURING DEVICE

TECHNICAL FIELD

The present invention relates to a component-securing device that includes a strip-shaped joining pin that includes a pair of wide faces and a pair of narrow faces and that has a large number of to-be-engaged portions formed on at least one of the pair of wide faces, and a clip that is detachably engaged with the joining pin to secure a component.

BACKGROUND ART

Such a component-securing device in which a tongue piece and a securing member having a claw are provided so as to oppose each other on one diameter of an annular clip, a bridging member having a middle part connected to the extremity of the securing member is provided on another diameter orthogonal to said one diameter, and the clip is secured to a joining pin by inserting the joining pin into a space between the securing member and the tongue piece and engaging the claw of the securing member therewith is known from Patent Document 1 below.

With regard to this component-securing device, when the dip is separated from the joining pin, opposite end parts on said other diameter of the clip are pinched with the fingers and pushed in a direction in which they approach each other to thus make the bridging member flex into an arc shape, and the securing member connected to the middle part of the bridging member is moved in a direction in which engagement with the joining pin is released.

RELATED ART DOCUMENTS

Patent Documents

Patent Document 1: U.S. Patent Laid-open No. 2012/0186050A1

SUMMARY OF THE INVENTION

Problems to be Solved by the Invention

However, the arrangement described in Patent Document 1 above has the problem that, since the annular clip is formed into a pre-curved shape so that it curves three-dimensionally when the opposite end parts on said other diameter clip are pinched with the fingers and pushed in order to separate the clip from the joining pin, and the bridging member and the seeming member intersect each other in a complicated shape, the structure of a die for molding it becomes complicated, thus causing an increase in the cost.

The present invention has been accomplished in light of the above circumstances, and it is an object thereof to achieve a small size and low cost by simplifying the shape of a clip of a component-securing device.

Means for Solving the Problems

In order to attain the above object, according to a first aspect of the present invention, there is provided a component-securing device comprising a strip-shaped joining pin that comprises a pair of wide faces and a pair of narrow faces and that has a large number of to-be-engaged portions formed on at least one of the pair of wide faces, and a clip that is detachably engaged with the joining pin to secure a component, wherein the clip comprises a ring-shaped outer peripheral portion, a pair of support post portions that extend inward from two mutually opposing first positions of the outer peripheral portion, a pair of joining pin insertion portions that are provided on mutually opposing extremity parts of the pair of support post portions and into which the joining pin can be fitted, an engagement portion that is provided on at least one of the pair of joining pin insertion portions and that is capable of engaging with the to-be-engaged portion of the joining pin, and a pair of pressing portions that are provided on two second positions sandwiched by the two first positions of the outer peripheral portion; pushing the pair of pressing portions in a direction of approaching each other makes the outer peripheral portion deform and the pair of joining pin insertion portions move in a direction of moving away from each other, and engagement between the engagement portion and the to-be-engaged portion is released.

Further, according to a second aspect of the present invention, in addition to the first aspect, one of the pair of joining pin insertion portions comprises a pair of first projecting portions that project in an insertion direction of the joining pin and are capable of abutting against the pair of narrow faces of the joining pin.

Furthermore, according to a third aspect of the present invention, in addition to the second aspect, the other of the pair of joining pin insertion portions comprises a pair of second projecting portions that project in the insertion direction of the joining pin and are capable of abutting against the pair of first projecting portions.

Moreover, according to a fourth aspect of the present invention, in addition to the second or third aspect, a projection height of the first projecting portion coincides with a height of a cut-off position of the joining pin.

Further, according to a fifth aspect of the present invention, in addition to any one of the first to fourth aspects, at least one of the pair of joining pin insertion portions comprises a stopper portion that projects toward the other so as to be capable of abutting thereagainst.

Furthermore, according to a sixth aspect of the present invention, in addition to any one of the first to fifth aspects, the clip comprises a flat face on a side opposite to the insertion direction of the joining pin.

Moreover, according to a seventh aspect of the present invention, in addition to any one of the first to sixth aspects, the pressing portion comprises a recessed and raised portion.

A first flat face 14f of an embodiment corresponds to the flat face of the present invention.

Effects of the Invention

In accordance with the first aspect of the present invention, the component-seeming device is formed from the strip-shaped joining pin, which includes the pair of wide faces and the pair of narrow faces and has a large number of to-be-engaged portions formed on at least one of the pair of wide faces, and the clip, which detachably engages with the joining pin and secures the component. Since the clip includes the ring-shaped outer peripheral portion, the pan of support post portions, which extend inward from the two mutually opposing first positions of the outer peripheral portion, the pair of joining pin insertion portions, which are provided on the mutually opposing extremity parts of the pair of support post portions and into which the joining pin can be fitted, the engagement portion, which is provided on at least one of the pair of joining pin insertion portions and can engage with the to-be-engaged portion of the joining pin, and the pair of pressing portions, which are provided at the two second positions sandwiched by the two first positions of the outer peripheral portion, when the joining pin is inserted into the pair of joining pin insertion portions of the clip, the engagement portion of the clip engages with the to-be-engaged portion of the joining pin, thus restraining the clip non-movably and thereby holding and securing the component by means of the clip. Furthermore, when the pair of pressing portions are pushed in the direction in which they approach each other, the outer peripheral portion deforms, the pair of joining pin insertion portions move in the direction in which they move away from each other, and the engagement between the engagement portion and the to-be-engaged portion is released, thereby enabling the clip to be pulled out from the joining pin.

In this way, merely deforming the outer peripheral portion of the clip inward enables the engagement with the joining pin to be released, and not only is it possible to reduce the dimension of the clip in the axial direction to thus achieve a small size, but it is also possible to simplify the shape of the clip, thus simplifying a die for molding and thereby cutting the cost of producing the clip.

Furthermore, in accordance with the second aspect of the present invention, since one of the pair of joining pin insertion portions includes the pair of first projecting portions, which project in the insertion direction of the joining pin and can abut against the pair of narrow faces of the joining pin, when the clip is pried up so that the pair of pressing portions move toward one side and the other side in the axial direction respectively, it is possible, by the first projecting portion abutting against the narrow face of the joining pin, to suppress tilting of the clip.

Moreover, in accordance with the third aspect of the present invention, since the other of the pair of joining pin insertion portions includes the pair of second projections, which project in the insertion direction of the joining pin and can abut against the pair of first projecting portions, when the clip is pulled out from the joining pin, even if the pair of support post portions attempt to flex in a direction opposite to the direction in which the clip is pulled out, it is possible to suppress flexing of the support post portions by means of abutment between the first projecting portion and the second projection, thus enabling the clip to be pulled out smoothly.

Furthermore, in accordance with the fourth aspect of the present invention, since the projection height of the first projecting portion coincides with the height of the cut-off position of the joining pin, it is possible to easily cut off the joining pin at an appropriate position by cutting off an unwanted part of the joining pin using the first projecting portion as a guide.

Moreover, in accordance with the fifth aspect of the present invention, since at least one of the pair of joining pin insertion portions includes a stopper part projecting toward the other so as to be capable of abutting thereagainst, when a load in a direction in which the two second positions of the outer peripheral portion move close to each other is applied, it is possible to receive the load not only with the outer peripheral portion but also with the support post portion, thus minimizing unnecessary deformation of the outer peripheral portion.

Furthermore, in accordance with the sixth aspect of the present invention, since the clip includes the flat face on the side opposite to the insertion direction of the joining pin, it is possible to disperse the load by making the clip be in surface contact with the opposing part via the flat face, thus enabling strong securing while preventing the clip from deforming.

Moreover, in accordance with the seventh aspect of the present invention, since the pressing portion includes the recessed and raised portion, not only does it become difficult for the fingertips to slip when pinching the pressing portions with the fingers and pushing them in the direction in which they approach each other, but it is also possible to identify the position of the pressing portion by touch when the operation is earned out in a place where the clip cannot be seen.

EXPLANATION OF REFERENCE NUMERALS AND SYMBOLS

12 Component
13 Joining pin
13*c* To-be-engaged portion
14 Clip
14*a* Outer peripheral portion
14*b* Support post portion
14*c* Joining pin insertion portion
14*d* Stopper portion
14*e* Pressing portion
14*f* First flat face (flat face)
14*h* First projecting portion
14*i* Second projecting portion
14*j* Engagement portion
a Wide face
b Narrow face
c First position
d Second position

MODES FOR CARRYING OUT THE INVENTION

All embodiment of the present invention is explained below by reference to FIG. 1 to FIG. 9.

First Embodiment

Figure 1:
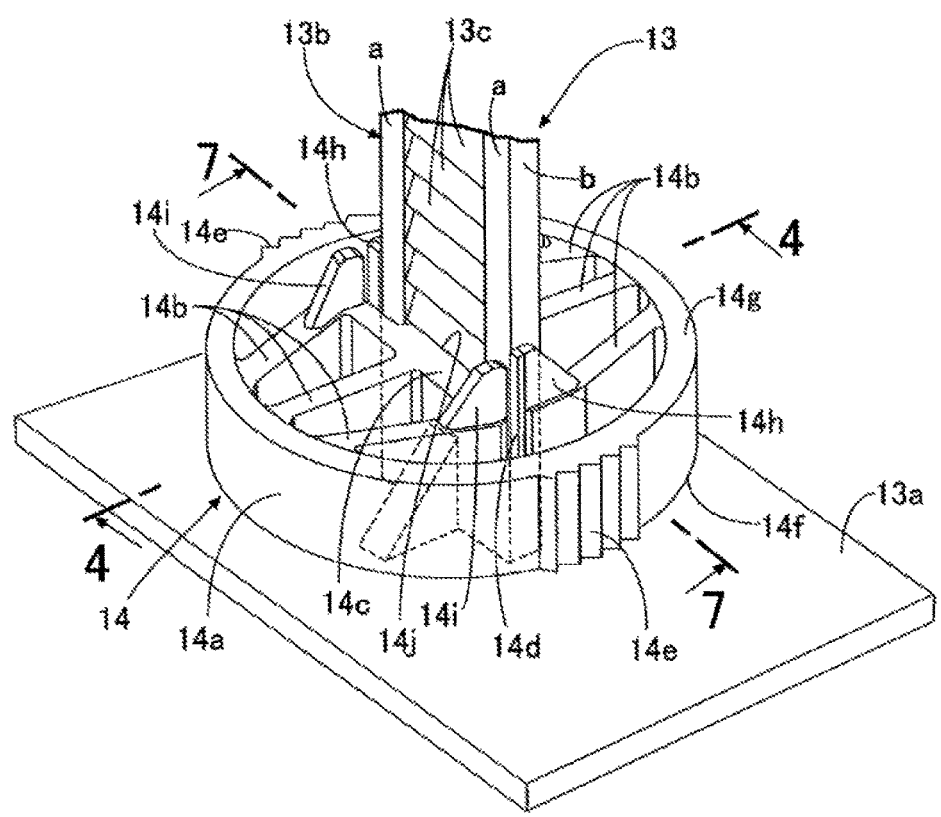
FIG. 1 is a perspective view of a component-securing device. (first embodiment)
Figure 4:
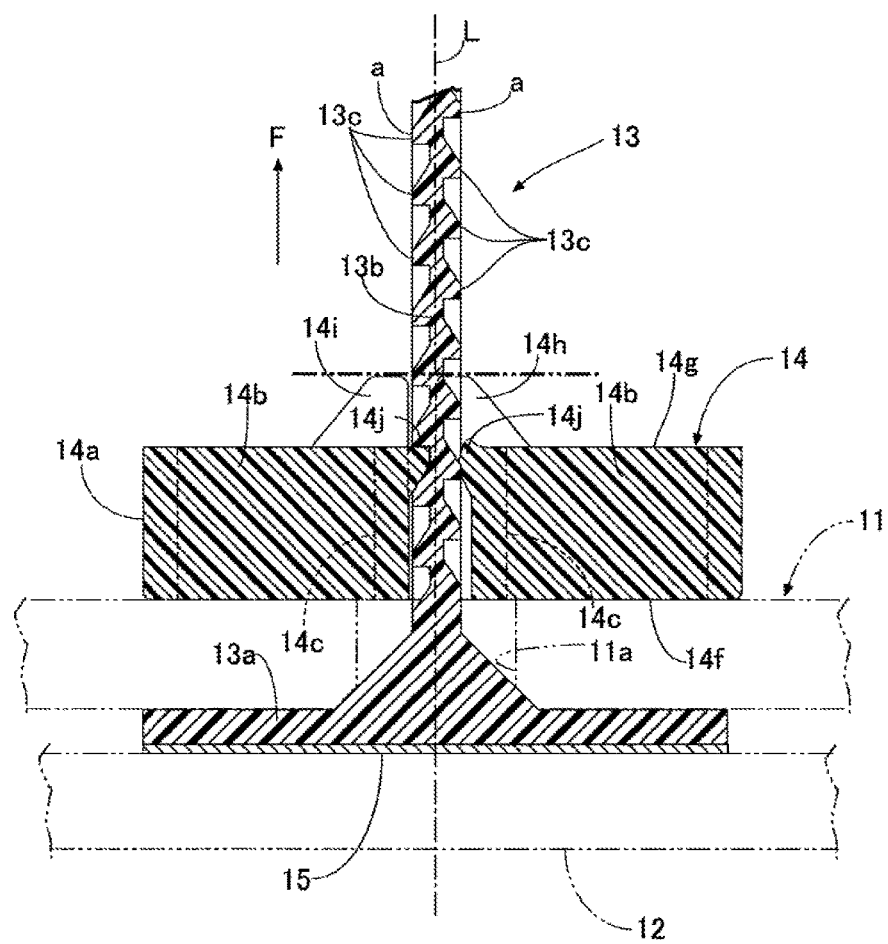
FIG. 4 is a sectional view along line 4-4 in FIG. 1. (first embodiment)

As shown in FIG. 1 and FIG. 4, a component-securing device related to the present embodiment is used for detachably securing a component 12 that is for example an automobile under spoiler to a base member 11 that is for example an automobile bumper face, and is formed from a synthetic resin joining pin 13 and a synthetic resin clip 14 fitted onto the joining pin 13. The joining pin 13 includes a rectangular plate-shaped mounting portion 13a and a strip-shaped joining pin main body 13b rising vertically in an axis L direction from a central part of the mounting portion 13a, the mounting portion 13a being seemed to the component 12 by means of double-sided tape 15.

The strip-shaped joining pin main body 13b has a basically rectangular cross section and includes wide faces a and a corresponding to a pair of long sides of the cross section and narrow faces b and b corresponding to a pair of short sides of the cross section. A large number of to-be-engaged portions 13c as recessed and raised portions having a triangular cross section are formed on the pair of wide faces a and a by making indentations therein, the phase of the to-be-engaged portions 13c on one wide face a being displaced in the axis L direction by half of the pitch from the phase of the to-be-engaged portions 13c on the other wide face a (see FIG. 4).

Figure 2:
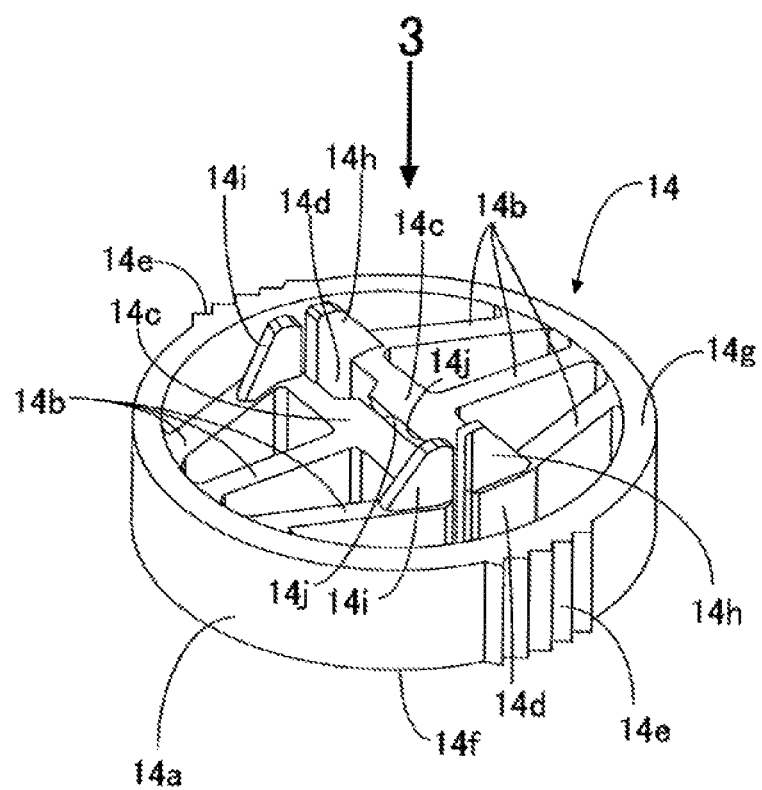
FIG. 2 is a perspective view of a clip. (first embodiment)

The structure of the clip 14 is now explained by reference to FIG. 2 and FIG. 3.

Figure 3:
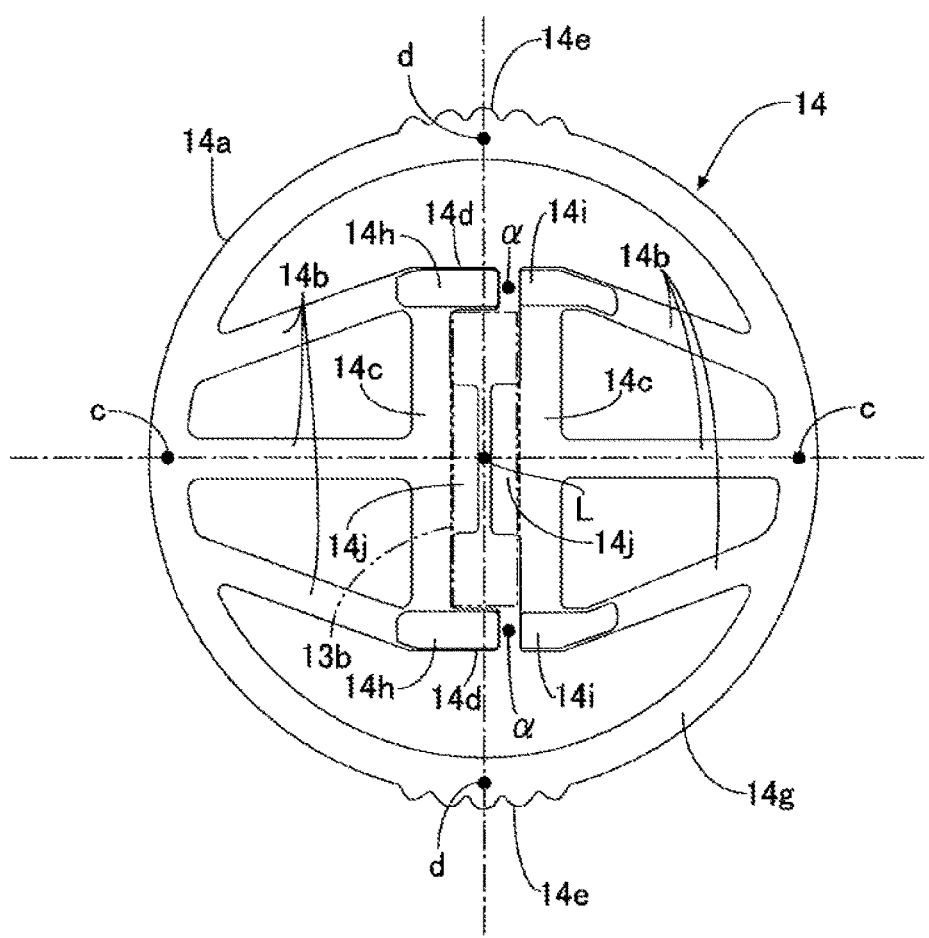
FIG. 3 is a view in the direction of arrow 3 in FIG. 2. (first embodiment)

The clip 14 includes an annular outer peripheral portion 14a having the axis L as the center, opposite ends on one diameter direction of the outer peripheral portion 14a being defined as first positions c and c, and opposite ends on another diameter direction that is orthogonal to said one diameter direction being defined as second positions d and d (see FIG. 3). Three support post portions 14b project inward in the radial direction from the vicinity of each first position c, and a plate-shaped joining pin insertion portion 14c is provided on the extremity of the support post portions 14b. The pair of joining pin insertion portions 14c and 14c oppose each other in parallel across a gap that is substantially equal to the thickness of the joining pin main body 13b, and the joining pin main body 13b is inserted therethrough. A pair of stopper portions 14d and 14d project from opposite ends of one of the pair of joining pin insertion portions 14c and 14c toward the other, and the pan of joining pin insertion portions 14c and 14c oppose each other across a gap α (see FIG. 3) so as to be capable of abutting against each other via the stopper portions 14d and 14d. Furthermore, pressing portions 14e and 14e formed from a plurality of recessed and raised portions are provided on an outer face of the vicinity of the second positions d and d of the outer peripheral portion 14a.

The outer peripheral portion 14a, the support post portions 14b, the joining pin insertion portions 14c and 14c, the stopper portions 14d and 14d, and the pressing portions 14e and 14e all have the same thickness in the axis L direction; a first flat face 14f is formed on one end face in the axis L direction, that is, on a side opposite to the insertion direction, shown by the arrow F, of the joining pin 13 (see FIG. 4), and a second flat face 14g is formed on the same side as the direction, shown by the arrow F, in which the joining pin 13 is inserted. A pair of triangular first projecting portions 14h and 14h and a pair of triangular second projecting portions 14i and 14i project from the second flat face 14g in the axis L direction.

That is, the pair of first projecting portions 14h and 14h project in the axis L direction from opposite end parts of one joining pin insertion portion 14c, and the pair of second projecting portions 14i and 14i project in the axis L direction from opposite end parts of the other joining pin insertion portion 14c. In this arrangement, the first projecting portions 14h and 14h are at positions that extend in the axis L direction from the stopper portions 14d and 14d, and the first projecting portions 14h and 14h and the second projecting portions 14i and 14i oppose across the gap α (see FIG. 3) so as to be capable of abutting against each other.

A pair of claw-shaped engagement portions 14j and 14j that are continuous with the second flat face 14g are projectingly provided on the pair of joining pin insertion portions 14c and 14c of the clip 14 so as to oppose each other. These engagement portions 14j and 14j are capable of engaging with the to-be-engaged portions 13c and 13c of the joining pin main body 13b.

The operation of the embodiment of the present invention having the above arrangement is now explained.

In order to secure the component 12 to the base member 11, the mounting portion 13a of the joining pin 13 is first secured to the component 12 by means of the double-sided tape 15, and the joining pin main body 13b is then made to pass, from the extremity, through a through hole Ha (see FIG. 4) formed in the base member 11. Subsequently, the extremity of the joining pin main body 13b is inserted into the joining pin insertion portions 14c and 14c of the clip 14 from the first flat face 14f side of the clip 14 and, while pulling the extremity of the joining pin main body 13b forward using one hand, the base member 11 is pushed away using the other hand.

As a result, the engagement portions 14j and 14j of the clip 14 slide along the to-be-engaged portions 13c of both of the wide faces a and a of the joining pin main body 13b; finally, either one of the engagement portions 14j engages with one of the to-be-engaged portions 13c of one wide face a, the clip 14 is integrated with the joining pin main body 13b, the base member 11 is held between the mounting portion 13a of the joining pin 13 and the first flat face 14f of the clip 14, and as shown in FIG. 4 the component 12 is seemed to the base member 11. In a state in which the component 12 is seemed by means of the clip 14, the first flat face 14f of the clip 14 is in surface contact with the base member 11 to thus disperse the load, thereby enabling strong securing while preventing the clip 14 from deforming.

The reason why only one of the pair of engagement portions 14j and 14j engages with the to-be-engaged portion 13c is because the phases of the to-be-engaged portions 13c of the pair of wide faces a and a of the joining pin main body 13b are displaced from each other by half of the pitch. In this arrangement, since the other engagement portion 14j that is not engaged is pushed back by means of the to-be-engaged portion 13c and undergoes elastic deformation, it does not interfere with engagement of said one engagement portion 14j.

Figure 5:
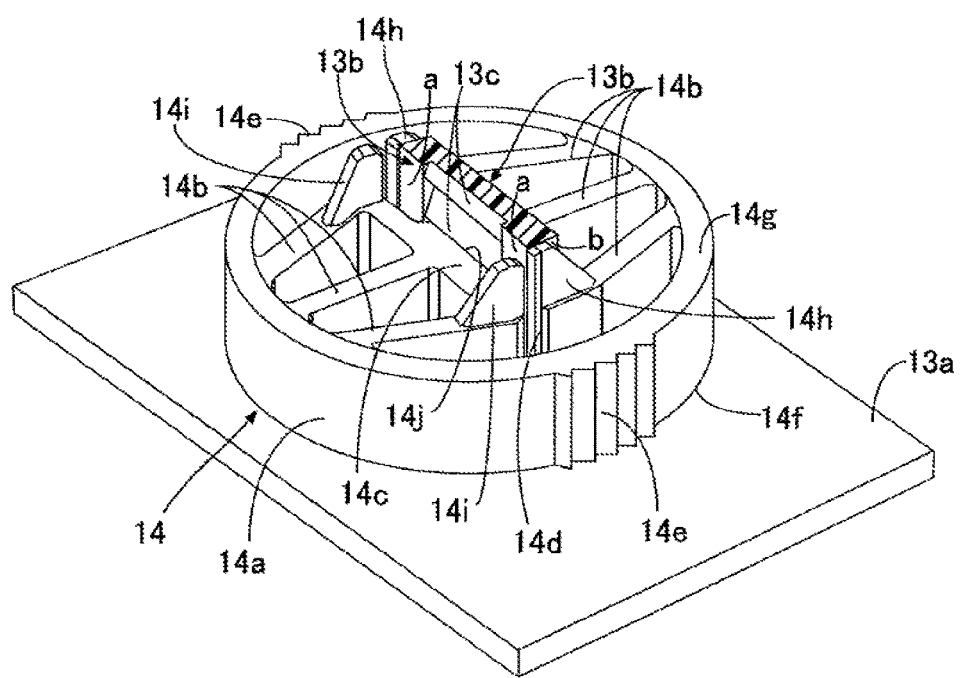
FIG. 5 is a view showing a state in which an excess portion of a joining pin main body is cut off. (first embodiment)

As described above, after the component 12 is seemed to the base member 11 using the joining pin 13 and the clip 14, an excess portion of the joining pin main body 13b projecting from the clip 14 is cut off at a cut-offline shown by the thick double-dotted broken line in FIG. 4 using a cutter. In this arrangement, by cutting off the joining pin main body 13b using the extremities of the first projecting portions 14h and 14h and the second projecting portions 14i and 14i as a guide, as shown in FIG. 5, not only is it possible to carry out cutting at an appropriate cut-off position but it is also possible to carry out cutting easily.

Figure 6:
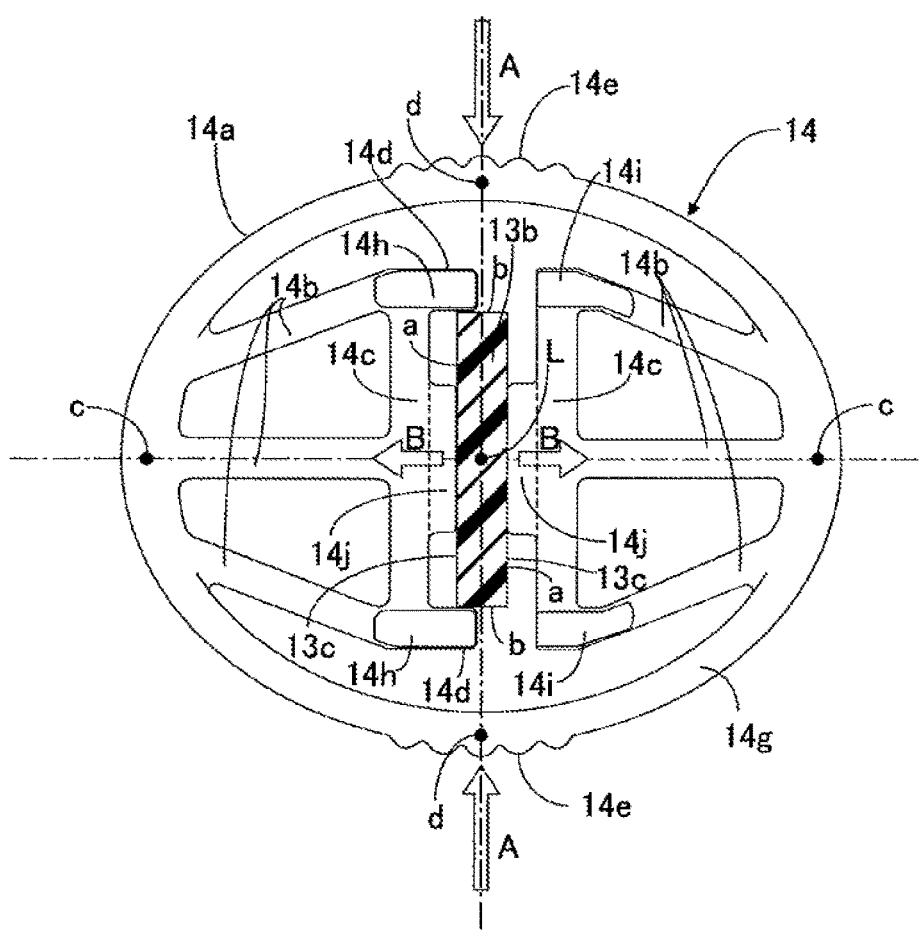
FIG. 6 is a diagram for explaining the operation of a first projecting portion of the clip. (first embodiment)

Here, to separate the clip 14 from the joining pin 13 in order to detach the component 12, as shown in FIG. 6 the pair of pressing portions 14e and 14e of the clip 14 are pinched using two fingers and pushed in the directions of arrows A and A, thus deforming the circular outer peripheral portion 14a into an elliptical shape. As a result, the pail of support post portions 14b and the pair of joining pin insertion portions 14c and 14c move in the direction of arrows B and B so as to move away from each other, and the pair of engagement portions 14j and 14j are disengaged from the to-be-engaged portions 13c of the joining pin main body 13b, thus enabling the clip 14 to be pulled out from the joining pin main body 13b.

In this way, merely pushing the pressing portions 14e and 14e of the clip 14 with the fingertips enables the pan of engagement portions 14j and 14j to be moved away from each other and engagement with the joining pin 13 to be released, and it is therefore possible not only to reduce the dimension of the clip 14 in the axis L direction to thus achieve a small size, but it is also possible to simplify the shape of the clip 14, thus simplifying a die for molding and cutting the cost of producing the clip 14.

Furthermore, even if it is necessary to carry out operations of attaching the joining pin 13 to the clip 14 and detaching it therefrom using the hands in a place where a worker cannot see them, since the pressing portions 14e and 14e provided on the outer peripheral portion 14a of the clip 14 include the recessed and raised portion, it is possible for the worker to identify the positions of the pressing portions 14e and 14e by touch with the fingertips, thus improving the ease of operation. Moreover, it is possible to prevent the fingertips from slipping by means of the recessed and raised portion provided on the pressing portions 14e and 14e, thus further improving the ease of operation.

Figure 7:
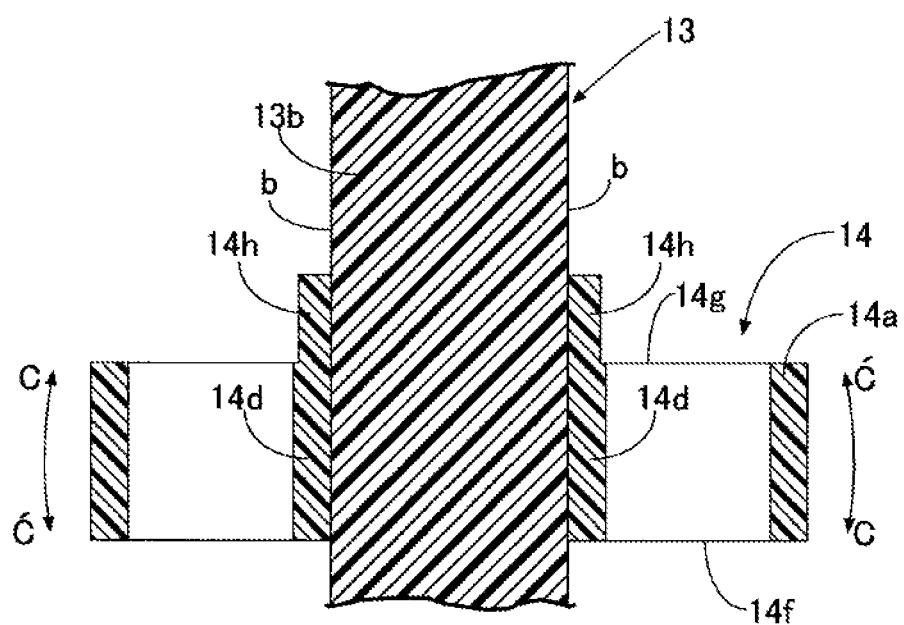
FIG. 7 is a sectional view along line 7-7 in FIG. 1. (first embodiment)

Moreover, as shown in FIG. 7, when the clip 14 is pried up in the direction of arrows C-C" within a plane of the joining pin main body 13b, if the clip 14 tilts greatly, there is a possibility that engagement between the engagement portions 14j and 14j and the to-be-engaged portions 13c will be released, but since first projecting portions 14h and 14h projecting from the second flat face 14g of the clip 14 abut against the narrow faces b and b of the joining pin main body 13b, it is possible to suppress tilting of the clip 14 in the direction of the arrows C-C", thus preventing the engagement portions 14j and 14j and the to-be-engaged portions 13c from being disengaged.

Figure 8:
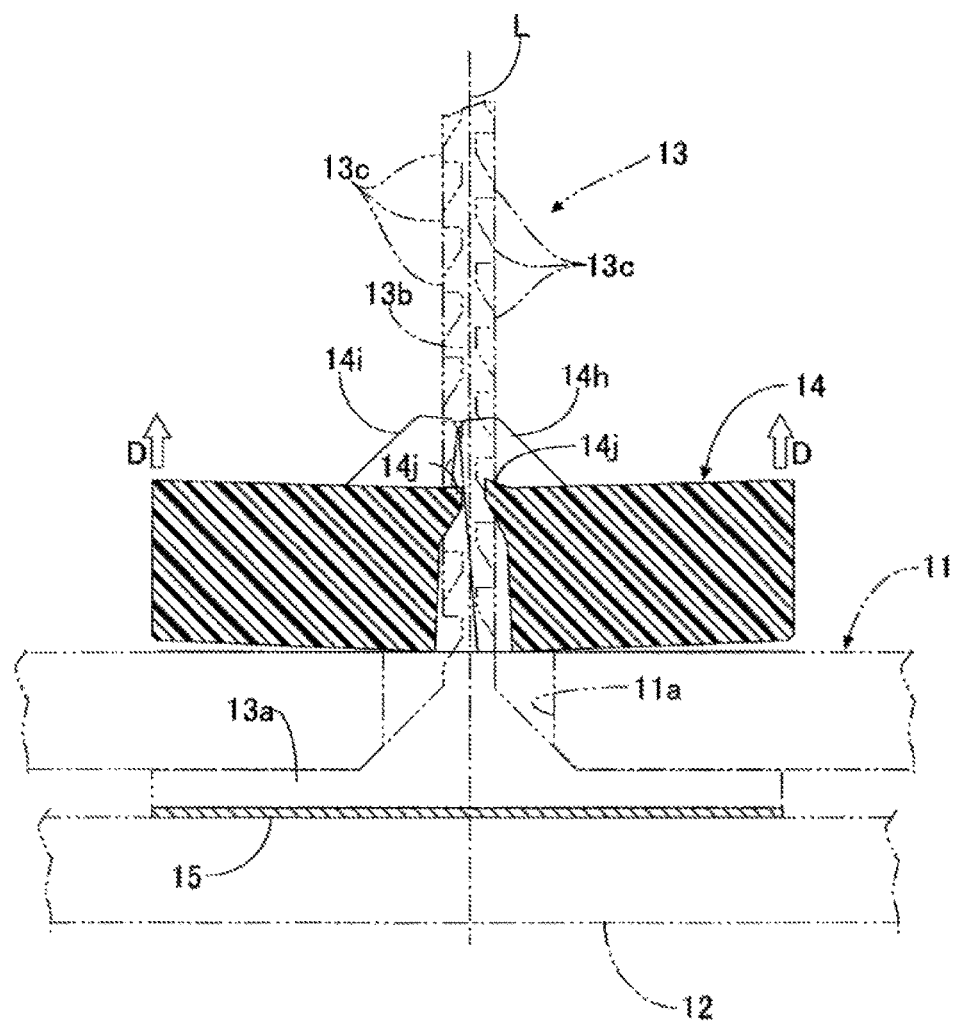
FIG. 8 is a diagram for explaining the operation of the first projecting portion and a second projecting portion of the clip. (first embodiment)

Furthermore, as shown in FIG. 8, if the clip 14 is forcibly pulled off the joining pin main body 13b in the direction of arrows D, the support post portions 14b and the joining pin insertion portions 14c and 14c are flexed in the axis L direction by means of the reaction force that the engagement portions 14j and 14j of the clip 14 receive from the to-be-engaged portions 13c of the joining pin main body 13b, and there is a possibility that engagement between the engagement portions 14j and 14j and the to-be-engaged portions 13c will be released. However, since the reaction force makes the extremities of the first projecting portions 14h and 14h and the extremities of the second projecting portions 14i and 14i abut against each other to thus prevent the support post portions 14b and the joining pin insertion portions 14c and 14c from flexing, it is possible to prevent engagement between the engagement portions 14j and 14j and the to-be-engaged portions 13c from being released.

Figure 9:
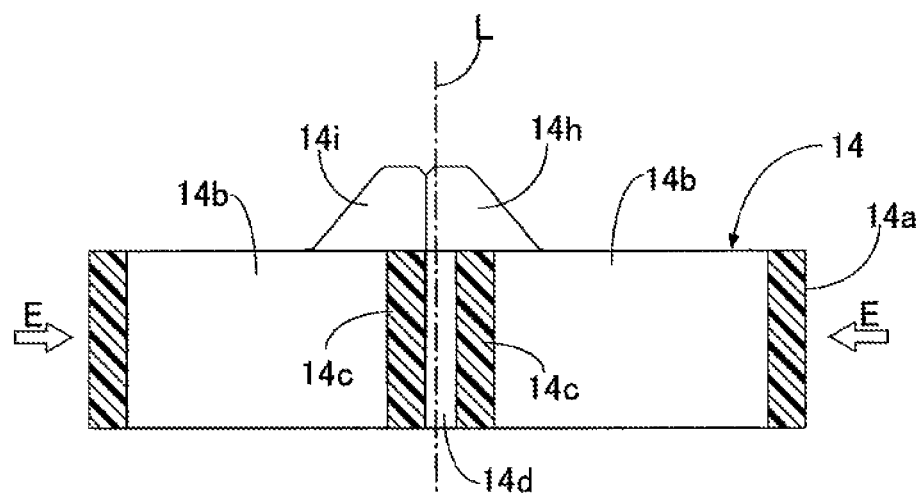
FIG. 9 is a diagram for explaining the operation of a stopper part of the clip. (first embodiment)

Furthermore, as shown in FIG. 9, when a load in a direction of arrows E-E acts on the pair of first positions c and c of the outer peripheral portion Ma in a state in which the clip 14 is in isolation, the stopper portions 14d and 14d projecting from one joining pin insertion portion 14c abut against the other joining pin insertion portion 14c, thus preventing excessive deformation of the outer peripheral portion 14a.

An embodiment of the present invention is explained above, but the present invention may be modified in a variety of ways as long as the modifications do not depart from the spirit and scope thereof.

For example, the outer peripheral portion of the clip of the present invention does not always need to be circular and may have a ring shape such as a rectangular, hexagonal, octagonal, etc. shape.

Furthermore, the component of the present invention is not limited to the under spoiler of the embodiment.

Moreover, in the embodiment the joining pin 13 is provided on the component 12 side, but the joining pin 13 may be provided on the base member 11 side.

Furthermore, in the embodiment the stopper portions 14d and 14d are provided on one of the pair of joining pin insertion portions 14c and 14c, but stopper portions 14d may be provided on both thereof.

Moreover, in the embodiment the engagement portions 14j and 14j are provided on both of the pair of joining pin insertion portions 14e and 14c, but an engagement portion 14j may be provided on only either one of joining pin insertion portions 14c.

Furthermore, in the embodiment the to-be-engaged portions 13c are provided on both of the pair of wide faces a and a of the joining pin main body 13b, but to-be-engaged portions 13c may be provided on only either one wide face a.

Moreover, in the embodiment the support post portions 14b are divided into three, but the number and shape of the support post portions 14b may be freely chosen.

The invention claimed is:

1. A component-securing device comprising a strip-shaped joining pin that comprises a pair of wide faces and a pair of narrow faces and that has a large number of to-be-engaged portions formed on at least one of the pair of wide faces, and a clip that is detachably engaged with the joining pin to secure a component, wherein
   the clip comprises a ring-shaped outer peripheral portion, a pair of support post portions that extend inward from two mutually opposing first positions of the outer peripheral portion, a pair of joining pin insertion portions that are provided on mutually opposing extremity parts of the pair of support post portions and into which the joining pin can be fitted, an engagement portion that is provided on at least one of the pair of joining pin insertion portions and that is capable of engaging with the to-be-engaged portions of the joining pin, and a pair of pressing portions that are provided on two second positions sandwiched by the two first positions of the outer peripheral portion;
   each of the pair of joining pin insertion portions having an opposing face opposing each other in parallel across a gap; and
   pushing the pair of pressing portions in a direction of approaching each other makes the outer peripheral portion deform and the pair of joining pin insertion portions move in a direction of moving away from each other with the opposing faces of the pair of joining pin insertion portions being kept in parallel with each other, and engagement between the engagement portion and the to-be-engaged portions is released.

2. The component-securing device according to claim 1, wherein
   the pair of support post portions are provided on the outer peripheral portion in a state distanced from each other,
   one of the pair of joining pin insertion portions comprises a pair of first projecting portions that project in an insertion direction of the joining pin from opposite ends of the one of the pair of joining pin insertion portions,
   an other of the pair of joining pin insertion portions comprises a pair of second projecting portions that project in the insertion direction of the joining pin from opposite ends of the other of the pair of joining pin insertion portions, and in a state where the engagement portion and the to-be-engaged portions are engaged, due to a force generated when the clip is pulled off the joining pin, extremities of the first projecting portions and the second projecting portions are placed in abutment against each other.

3. The component-securing device according to claim 2, wherein a projection height of the first projecting portions coincides with a height of a cut-off position of the joining pin.

4. The component-securing device according to claim 2, wherein at least one of the pair of joining pin insertion portions comprises a stopper portion that abuts against the other of the pair of joining pin insertion portions when load is applied to the pair of joining pin insertion portions so as to make these joining pin insertion portions approach each other.

5. The component-securing device according to claim 2, wherein the clip comprises a flat face on a side opposite to an insertion direction of the joining pin.

6. The component-securing device according to claim 2, wherein the pressing portions comprises a recessed and raised portion.

7. The component-securing device according to claim 1, wherein at least one of the pair of joining pin insertion portions comprises a stopper portion that abuts against an other of the pair of joining pin insertion portions when load is applied to the pair of joining pin insertion portions so as to make these joining pin insertion portions approach each other.

8. The component-securing device according to claim 1, wherein the clip comprises a flat face on a side opposite to an insertion direction of the joining pin.

9. The component-securing device according to claim 1, wherein the pressing portions comprises a recessed and raised portion.

\* \* \* \* \*